United States Patent [19]
Laugherty et al.

[11] 3,854,482
[45] Dec. 17, 1974

[54] UMBILICAL CORD CLAMP

[75] Inventors: Lorene Laugherty; James R. Laugherty, both of Knoxville, Tenn.

[73] Assignee: Avis Research, Inc., Knoxville, Tenn.

[22] Filed: Nov. 22, 1972

[21] Appl. No.: 308,822

[52] U.S. Cl. ......... 128/346, 24/248 BB, 24/255 SL, 292/322
[51] Int. Cl. ............................................. A61b 17/08
[58] Field of Search .......... 24/16 PB, 73 P, 248 BB, 24/255 SL; 128/346; 132/48 R; 292/322

[56] References Cited
UNITED STATES PATENTS

| | | |
|---|---|---|
| 2,969,570 | 1/1961 | Petri et al. ...................... 24/16 PB |
| 3,247,852 | 4/1966 | Schneider ........................... 128/346 |
| D190,787 | 6/1961 | Schneider ..................... 128/346 X |

*Primary Examiner*—Channing L. Pace

[57] ABSTRACT

An umbilical cord clamp to be used either for human children or for animals, which is made usually of non-metallic material having a pair of elongated arms joined together at one end by means of a hinge loop and having at the opposite ends thereof a pair of hooks on one arm entering a box-like socket on the other arm to engage shoulders in the socket and to confine the arms in substantially closed position about the umbilical cord. Overlapping shoulders are also provided to prevent lateral deflection of the arms, which may thereby release the hook engagement between the free ends thereof.

5 Claims, 5 Drawing Figures

PATENTED DEC 17 1974        3,854,482
FIG.1
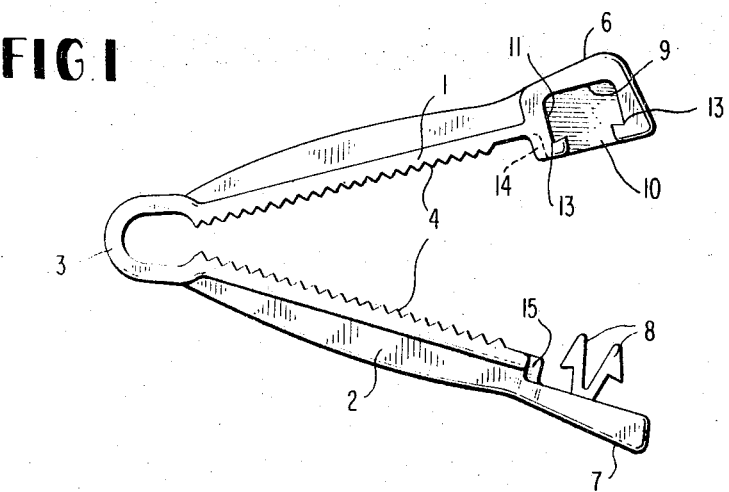
FIG.2
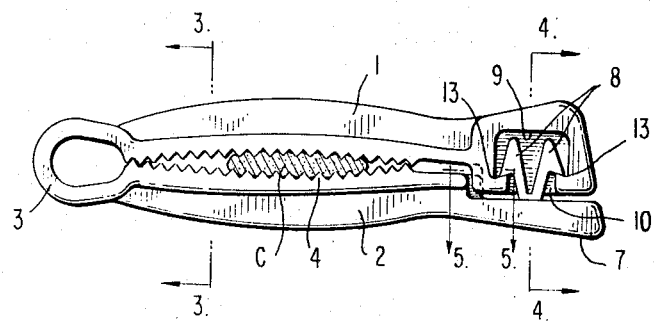
FIG.3
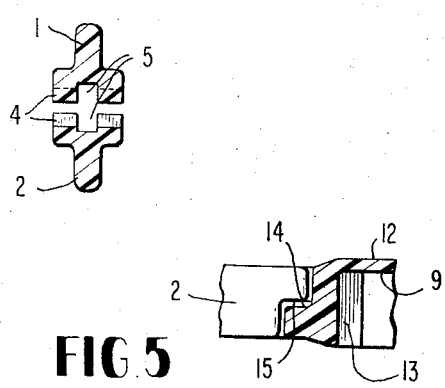
FIG.4
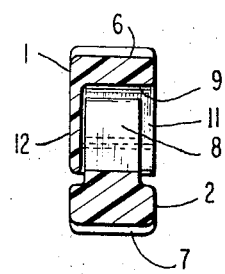
FIG.5

UMBILICAL CORD CLAMP

SUMMARY OF THE INVENTION

This invention relates to improvements in umbilical cord clamps of the character used for pinching off the umbilical cords either of infants or of animals, such as pigs, calves, lambs, etc., and thereby preventing the loss of blood or becoming anemic.

Umbilical cord clamps have been made heretofore of a size and character suitable for human babies, but there is a serious problem involved in the connection between the free ends of the arms of the clamp which may work loose before the cord dries up enough to slough off. Moreover, the character of the cord clamps, as made heretofore, has not been such as to permit use thereof on animals, particularly calves, pigs or lambs, and which may require somewhat larger clamps and that these be secured tightly on the cord against danger of being rubbed off in exposed positions.

One object of this invention is to simplify and improve the construction of umbilical cord clamps to enable these to be made for use either on human babies or on animals.

Another object of the invention is to so construct the umbilical cord clamps that these may be made of larger sizes than used heretofore and yet obtain secure connection between the free ends of the arms thereof so as to prevent accidental release or removal of the cord clamps.

Still another object of the invention is to improve the connection between the free ends of the arms of a cord clamp to provide for the molding thereof in an inexpensive construction and yet to enable the free ends to be engaged securely in the various sizes of the clamp without danger of becoming separated from each other and releasing the cord during use.

These objects may be accomplished, according to one embodiment of the invention, by constructing a cord clamp of a suitable moldable material, with a pair of arms disposed substantially in V shape and connected together at one end by a hinge loop, the opposite ends of the arms being free and having latching means for interconnecting the free ends. One of the arms has a box-like socket in the free end thereof, open at the face toward the other arm and also laterally, to facilitate molding of the cord clamp in an inexpensive construction. The free end of the other arm has a pair of hooks turned in opposite directions and disposed to enter the socket and engage shoulders therein to effect a latching engagement between the free ends of the arms when these are pressed together about the cord of the infant or animal. Provision is made for preventing lateral disengagement of the hooks from the socket by means of upright shoulders on the adjacent portions of the arms when brought into closed relation in such positions as to prevent of lateral deflection of one arm with respect to the other.

BRIEF DESCRIPTION OF DRAWINGS

This embodiment of the invention is illustrated in the accompanying drawings, in which:

FIG. 1 is a side elevation of a cord clamp illustrating this invention, with the arms in open position;

FIG. 2 is a similar view, showing the arms in closed position;

FIG. 3 is a cross section therethrough on the line 3—3 in FIG. 2;

FIG. 4 is a cross section through the socket on the line 4—4 in FIG. 2; and

FIG. 5 is a detail longitudinal section on the line 5—5 in FIG. 2.

DETAILED DESCRIPTION OF DRAWINGS

The invention is illustrated in the form of cord clamp having a pair of arms, generally indicated at 1 and 2, which extend lengthwise of each other and may be made of a suitable plastic material so as to be sterile and inexpensive to use. Usually, the cord clamp is molded and, as initially formed, the arms 1 and 2 are in V-shaped relation, as illustrated in FIG. 1. The arms 1 and 2 are connected together at one end by a hinge loop 3 formed in one integral piece therewith so as to enable the arms to be opened and closed with respect to each other.

The arms are semi-rigid to permit the same to bow slightly when clamped about a cord, as illustrated generally at C in FIG. 2. It is preferred that the inner edge portions of the arms be formed with teeth 4 thereon to facilitate gripping of the cord C and these arms also usually have grooves 5 extending lengthwise thereof, as illustrated in FIG. 3. These grooves also aid in gripping the cord.

The opposite or free ends of the arms 1 and 2 are provided with means for latching the arms in the closed relation shown in FIG. 2. These arms are provided with faces 6 and 7 on the outer ends thereof that may be gripped between the thumb and forefinger to move the latching means into closed relation.

The latching means comprises a pair of hooks 8 formed on the inner face of the free end of the arm 2, with the engaging hooks thereof turned in opposite directions and with the shanks of the hooks disposed substantially in V shape. These shanks will flex sufficiently, being formed of semi-rigid, moldable material to enable the hooks to move toward each other for latching.

The free end of the arm 1 is provided with a box-like socket 9 thereon, which has an opening 10 facing toward the free end of the arm 2; and also having an open side 11 at a lateral side of the socket, as will be clear from FIG. 4, and with a socket wall 12 opposite the opening 11. This construction makes it practical to mold the socket of the desired moldable material.

Shoulders are formed at 13 in the two opposite walls of the socket 9, spaced apart lengthwise of the arm 1, to be engaged respectively between hooks 8 when the latter enter the socket. To facilitate the molding operation, the shoulders 13 extend completely from side to side of the socket to the open side 11 thereof.

Provision is made for preventing lateral displacement of the hooks 8 from the socket through the open side 11 thereof. This is made possible by upright shoulders 14 and 15, which are formed on the respective arms 1 and 2 adjacent the socket 9 and hooks 8 respectively in positions for overlapping when the free ends of the arms are moved to closed relation, as shown in FIG. 2. This relation of the shoulders 14 and 15 is illustrated also in FIG. 5.

The shoulder 15 on the arm 2 is on the opposite side of the shoulder 14 from the open lateral side 11 of the socket 9. Thus, any tendency for the hooks 8 to be deflected laterally through the open side, and thus release the free ends of the arms, is prevented by the lateral engagement of the shoulders 14 and 15.

In this way, the cord clamp can be secured effectively in closed relation, even when made of different sizes. It will maintain an effective and secure connection about the umbilical cord and be maintained securely in place, whether made of small size for human infants or larger sizes for animals, such as pigs, calves or lambs. It will remain in place on the cord until the latter drops off and thus prevent the loss of blood or the subject becoming anemic. Moreover, the use of the umbilical cord clamp does not require the use of an insecticide, as frequently practiced heretofore, especially with animals.

It is also possible to use the cord clamp for clamping the cords of animals in castration. In some instances, especially with calves, this may require still larger sizes, but an effective clamping action is thereby provided and it may be used for this purpose, if desired.

While the invention has been illustrated and described in one embodiment, it is recognized that variations and changes may be made therein without departing from the invention as set forth in the claims.

We claim:

1. An umbilical cord clamp comprising a substantially V-shaped member including a pair of arms joined together at the apex by a loop integral therewith and forming a hinge between the arms at one end thereof and with the opposite ends being free and normally spaced apart, said arms being movable toward each other to clamp a cord therebetween, and means on the free ends on the arms for latching the arms in clamping relation to the cord, said latching means including a pair of hooks on one arm facing in opposite directions and a box-like socket on the free end of the other arm having an entrance opening facing the hooks, said entrance opening having shoulders on opposite sides thereof in the direction of the hooks, the hooks having diverging shanks of yieldable material and with engaging faces in positions to overlap the respective shoulders when the latching means is in closed relation, said hooks having means thereon in position to engage the shoulders at the entrance opening yieldably to move the hooks toward each other during passage through the entrance opening thereby compressing the hooks toward each other and after passage through the opening the yieldable shanks of the hooks causing lateral expansion thereof apart into overlapping relation with the respective shoulders, the box-like socket being open at the lateral side for access laterally to the hooks.

2. An umbilical cord clamp according to claim 1, wherein the arms are formed of non-metallic semi-rigid material capable of flexing transversely of the length thereof.

3. An umbilical cord clamp according to claim 1, including means on the arms outside the recess for preventing transverse movement of the free end of one arm relative to the free end of the other arm in a direction toward the open side of the socket to disengage the hooks from the shoulders at the entrance opening.

4. An umbilical cord clamp comprising a substantially V-shaped member including a pair of arms joined together at the apex by a loop integral therewith and forming a hinge between the arms at one end thereof and with the opposite ends being free and normally spaced apart, said arms being movable toward each other to clamp a cord therebetween, one of the arms having a box-like socket on the free end thereof with an entrance opening toward the other arm and having a lateral side open, said socket having a shoulder therein at the entrance opening, a hook carried by the other arm in position to enter the socket through the entrance opening and engage the shoulder to hold the arms in clamping relation, and means interconnecting the arms to hold the same in longitudinal alignment and to prevent the hook from sliding out of engagement with the shoulder through the lateral open side and cause disengagement of the arms.

5. An umbilical cord clamp according to claim 4, wherein the interconnecting means includes upright shoulders on the free end portions of the arms outside the socket overlapping in a direction longitudinally of the arms, one shoulder projecting from a side of the socket at the lateral open side thereof, and the other shoulder on the arm having the hook lying laterally inwardly of the first-mentioned shoulder when the arms are in closed relation.

* * * * *